United States Patent [19]

Sasson

[11] Patent Number: 4,772,938
[45] Date of Patent: Sep. 20, 1988

[54] COLOR VIDEO SIGNAL FRAME STORE

[75] Inventor: Steven J. Sasson, Springwater, N.Y.

[73] Assignee: Eastman Kodak Company, Rochester, N.Y.

[21] Appl. No.: 915,184

[22] Filed: Oct. 3, 1986

[51] Int. Cl.$^4$ .............................................. H04N 9/64
[52] U.S. Cl. .................................... 358/21 R; 358/13
[58] Field of Search ................. 358/13, 12, 21 R, 310, 358/11, 22

[56] References Cited

U.S. PATENT DOCUMENTS

| | | | |
|---|---|---|---|
| 3,996,607 | 12/1976 | Heitmann | 358/13 |
| 4,015,286 | 3/1977 | Russel | 358/13 |
| 4,129,882 | 12/1978 | Limb | 358/13 |
| 4,148,070 | 4/1979 | Taylor | 358/160 |
| 4,163,249 | 7/1979 | Michael et al. | 358/21 R |
| 4,220,965 | 9/1980 | Heitmann et al. | 358/22 |
| 4,231,063 | 10/1980 | Ito et al. | 358/148 |
| 4,543,600 | 9/1985 | Bolger | 358/13 |
| 4,549,201 | 10/1985 | Tanaka et al. | 358/13 |
| 4,654,695 | 3/1987 | Fling | 358/11 |
| 4,689,660 | 8/1987 | Kashigi | 358/13 |

FOREIGN PATENT DOCUMENTS 0032278 2/1984 Japan ..................................... 358/13

Primary Examiner—James J. Groody
Assistant Examiner—David E. Harvey
Attorney, Agent, or Firm—William F. Noval

[57] ABSTRACT

Color video signal apparatus includes a digital memory for storing a frame of color video signal in a fast and efficient manner. A composite color video signal is separated into a luminance and two chrominance signals. A luminance analog to digital converter (ADC) converts the luminance signal into an N bit digital signal at a sampling frequency F. A chrominance ADC converts each of the two chrominance signals into an M bit digital signal having a sampling frequency $\frac{1}{4}$ F, where M is an even integer. N bits of a sample of the digital luminance signal and $\frac{1}{2}$ M bits of a sample of one of the two digital chrominance signals are simultaneously written into the memory. For each set of four successive N bit samples of digital luminance signal written into memory, an M bit sample of each of the two digital chrominance signals is also written into the memory. The invention is useful in video cassette recorders.

7 Claims, 4 Drawing Sheets

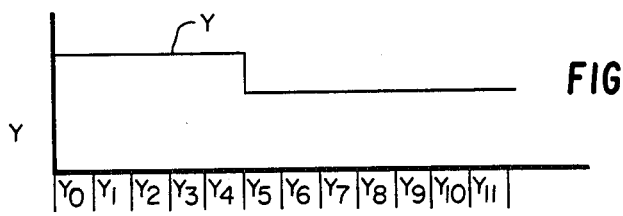
FIG 4A
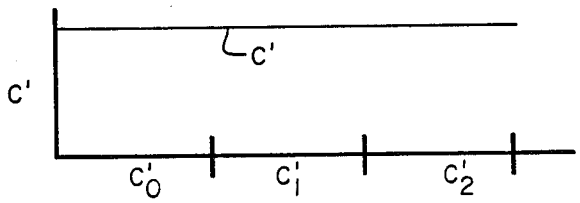
FIG 4B
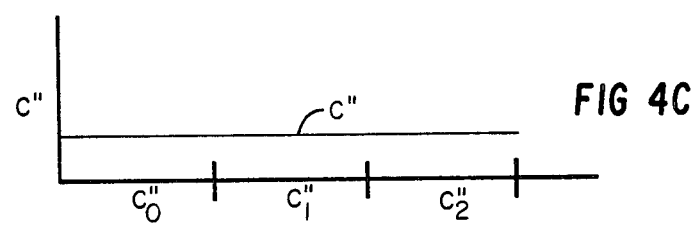
FIG 4C
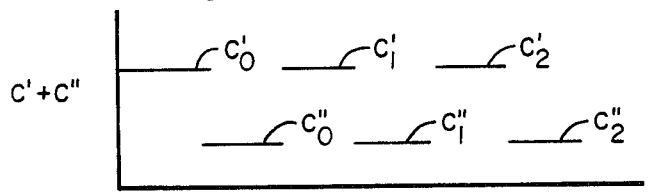
FIG 4D
| Y SAMPLE | $Y_0$ | $Y_1$ | $Y_2$ | $Y_3$ | $Y_4$ | $Y_5$ | $Y_6$ | $Y_7$ | $Y_8$ | $Y_9$ | $Y_{10}$ | $Y_{11}$ |
|---|---|---|---|---|---|---|---|---|---|---|---|---|
| # OF BITS PER SAMPLE | N | N | N | N | N | N | N | N | N | N | N | N |
FIG 4E
| C SAMPLE | $C'_0$ | $C'_0$ | $C''_0$ | $C''_0$ | $C'_1$ | $C'_1$ | $C''_1$ | $C''_1$ | $C'_2$ | $C'_2$ | $C''_2$ | $C''_2$ |
|---|---|---|---|---|---|---|---|---|---|---|---|---|
| # OF BITS PER SAMPLE | $M/2$ | $M/2$ | $M/2$ | $M/2$ | $M/2$ | $M/2$ | $M/2$ | $M/2$ | $M/2$ | $M/2$ | $M/2$ | $M/2$ |
FIG 4F
F      
$F/2$      
$F/4$

| ROW | COL. | ROW ADDRESS | COLUMN ADDRESS |
|---|---|---|---|
| 4 | 4 | 0 0 0 0 0 0 1 0 0 | 0 0 0 0 0 0 1 0 0 |
| 4 | 5 | 0 0 0 0 0 0 1 0 0 | 0 0 0 0 0 0 1 0 1 |
| 4 | 6 | 0 0 0 0 0 0 1 0 0 | 0 0 0 0 0 0 1 1 0 |
| 4 | 7 | 0 0 0 0 0 0 1 0 0 | 0 0 0 0 0 0 1 1 1 |

COLOR VIDEO SIGNAL FRAME STORE

BACKGROUND OF THE INVENTION

In general, this invention relates to apparatus for processing color video signals. More particularly, this invention relates to color video signal apparatus which includes a digital memory for storing a frame of a color video signal.

In many applications using color video displays, there exists a need for storing and processing frames of color video information. Thus in consumer video cassette recorder (VCR's), when a video signal is played back in a still frame mode, image degradation and decreased resolution result when the video head is used for reproducing images from video tape which has been recorded at one speed and played back when stopped. Image degradation results from the playback of video signals from adjacent tracks which are scanned by the rotating head. Poor image resolution results from the playback of a single field of a frame of color video information. Furthermore, in many applications it is desirable to process a frame of video information to achieve image enlargement or reduction, image rotation, superimposition of one image on another image, and the like. Such image processing techniques are unavailable in a VCR which only reproduces signals directly from the tape.

Providing a frame store for storing a frame of color video signals which may be repeatedly read out solves some of these problems but introduces other problems. In a frame store, it is desirable that sufficient video signal information is stored so as to display a reproduced image on a video monitor which accurately reflects the image resolution and color qualities of the original color video signal image. It is also desirable that the frame store and its associated analog-to-digital conversion circuitry be economical so that the frame store apparatus may be made more widely available to markets such as the consumer market. In digital frame stores where the composite color video signal has been sampled at high frequency sampling rates, (such as four times the frequency of the color subcarrier) the high speed analog-to-digital converter is expensive and produces a large number of digital samples for storage which increases the size and cost of the digital memory required. Similarly, a frame store which stores all three color component signals at full bandwidth requires three analog-to-digital converters and a large digital memory capacity thus increasing cost and complexity.

SUMMARY OF THE INVENTION

According to the present invention, there is provided color video signal apparatus including a digital memory or store for a frame of color video signal which solves these problems. According to an aspect of the invention, the luminance signal is sampled at a sampling frequency F and each of two chrominance signals are sampled at a sampling frequency $\frac{1}{4}$F. An N bit digital luminance sample signal and an M/2 bit digital chrominance signal sample are simultaneously written into the frame store, such that for each set oF four successive N bit samples oF digital luminance signals written into said framestore an M bit digital sample of each chrominance signal is also written into the framestore. Thus, lower sampling frequencies and less digital samples allow the use of smaller memory and slower, simpler and less costly electronic circuitry.

According to another aspect of the invention, the number oF analog-to-digital converters to sample the analog video signal is minimized. One analog-to-digital converter converts the luminance signal, and a second analog-to-digital converter converts the two chrominance signals, which have been multiplexed so that alternate chrominace samples are applied to the analog-to-digital converter. According to another aspect of the invention, the chrominance analog-to-digital converter converts the M/2 most significant bits of a chrominance signal sample and the M/2 least significant bits of the same chrominance sample during successive sampling periods. Thus, M/2 bits of a chrominance sample are written into the digital framestore at the same time as N bits of a luminance sample.

DESCRIPTION OF THE DRAWINGS

The invention will be described in detail with reference to the drawings in which like elements are numbered with like numbers.

FIGS. 4A-4I are respective waveform diagrams illustrating the operation of the apparatus of FIG. 1;

DESCRIPTION OF THE PREFERRED EMBODIMENT

In the following description of the preferred embodiment, the present invention is described with respect to the NTSC color video broadcast standard used in the United States, Japan and other countries. It will be understood, however, that the present invention is also usable with the PAL and SECAM broadcast standards used in Europe and other parts of the world. In the NTSC color broadcast system, a scene is represented by a composite color video signal constituting a frame of two interlaced odd and even fields. The composite color video signal includes luminance and chrominance signals which encode red, green and blue color video signals. The composite color signal is broadcast at 30 frames or 60 fields per second.

Figure 1:
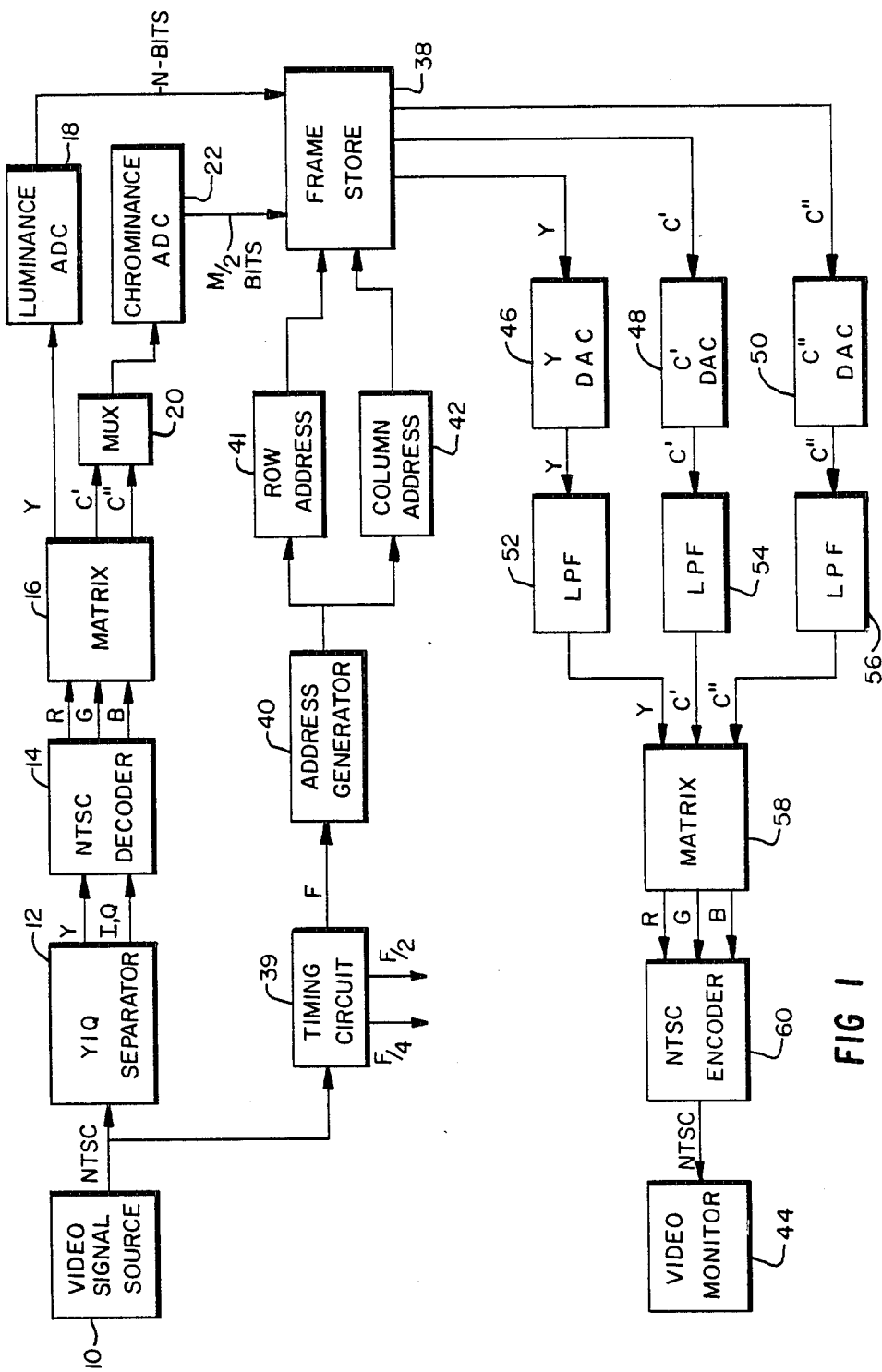
FIG. 1 is a schematic diagram of color video signal apparatus according to the present invention.

Referring now to FIG. 1, there is shown color video signal apparatus including a preferred embodiment of the present invention. As shown, a video signal source 10, (such as, as for example, a video camera, a video cassette recorder, a video disc player, or transmission channel) provides an NTSC composite color video signal to separator 12 which separates the luminance (Y) and two chrominance (I,Q) signals. Decoder 14 decodes these signals into red (R), green (G) and blue (B) color video signals. Matrix 16 converts the R, G, B video signals into a luminance (Y) video signal and two chrominance (C', C") video signals. The latter may be, e.g., color difference signals R-Y and B-Y.

Figure 4G:
Figure 4H:
Figure 4I:

The Y video signal (FIG. 4A) is applied to Y analog-to-digital converter (ADC) 18 which converts the analog Y video signal into an N bit digital signal (FIG. 4E)

at a sampling frequency of F (FIG. 4G). The analog C', C" video signals (FIGS. 4B, 4C) are multiplexed at a frequency of ½F (FIG. 4H) by multiplexer 20 to produce a multiplexed signal (FIG. 4D) which is applied to chrominance ADC 22 which samples the alternate chrominance signals at a sampling frequency of F/4 (FIG. 4I) to produce digital chrominance signals of M bits per sample. Chrominance ADC 22 outputs each M bit sample of a chrominance signal in a sequence of two M/2 bit samples (See FIG. 4F).

Figure 2:
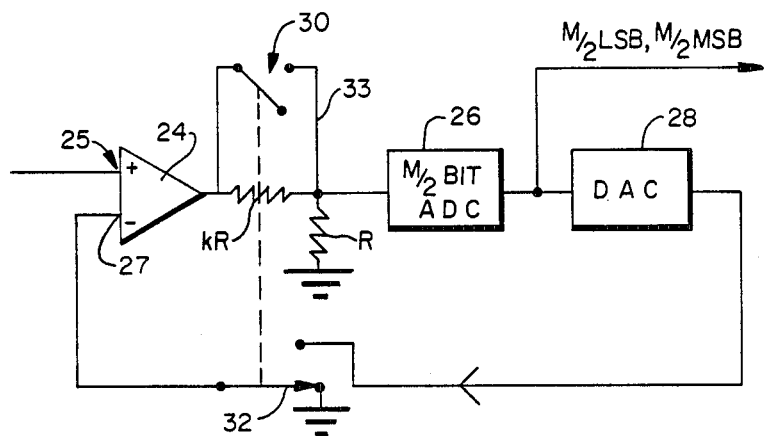
FIGS. 2 and 3 are respective schematic diagrams of analog-to-digital converters for effecting chrominance signal conversion in the apparatus of FIG. 1.

FIG. 2 illustrates one embodiment of chrominance ADC 22 which may be used to produce sequential chrominance digital signals. As shown during the first of two sample periods, the multiplexed analog chrominance video signal (FIG. 4D) is applied to the positive terminal 25 of operational amplifier 24, the output of which is applied to an M/2 bit analog-to-digital converter 26. The output of ADC 26 is the M/2 most significant bits (MSB) of the chrominance signal sample. This output is also applied to digital to analog converter (DAC) 28 whose analog output is fed back to the negative input 27 of operational amplifier 2. During the second of the two sample periods, switches 30 and 32 are actuated to apply this feedback signal to operational amplifier 24 and to apply the output of amplifier 24 through path 33 to ADC 26. ADC 26 produces an M/2 bit sample representing the M/2 least significant bits (LSB) of the same chrominance signal sample. This sequential analog-to-digital conversion is then repeated for the next chrominance signal sample.

Figure 3:
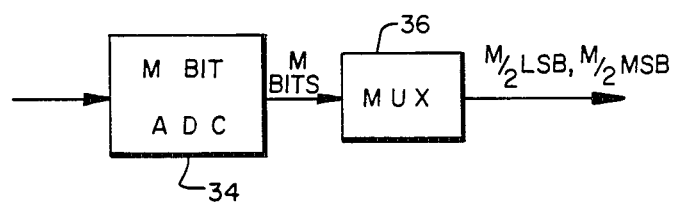

FIG. 3 shows another embodiment of chrominance ADC 22 in which an analog chrominance signal sample is applied to M bit ADC 34 which produces M bits of a digital sample of one of the chrominance signal samples. The M bit digital chrominance signal is then applied to multiplexer 36 to produce sequential M/2 bit samples (in the sequence of an M/2 MSB digital signal sample followed by an M/2 LSB digital signal sample).

An N bit digital luminance signal and an M/2 bit chrominance signal are simultaneously written into digital framestore 38 (which may, for example, comprise dynamic random access memories (DRAMS)).

As an example, it is assumed that the Y signal is sampled at 512 samples per line and the C' and C" signals are sampled at 128 samples per line. If the video frame comprises 512 horizontal lines of active video information there will be 262,144 samples in a color video frame. If N=7 bits for the Y digital signal and M=6 bits for each of the C' and C" digital signals, then N+M/2 bits=7+6/2, or 10 bits per sample, so that 10-256k DRAMS may be used for framestore 38. In such case, 10 bits of information are written into the 10 DRAMS simultaneously. The reading into and writing out of digital information to and from framestore 38 is controlled by a control circuit including timing circuit 39, address generator 40, now address circuit 41, and column address circuit 42.

Timing circuit 39 provides timing signals F, F/2 and F/4 (FIGS. 4G-4I) to synchronize the operation of the various components of the apparatus of FIG. 1.

To display a frame of color video information stored in framestore 38 on video monitor 44, N bits of the Y luminance signal and M bits of each of the chrominance signals C' or C" are read out from framestore 38 and applied to digital-to-analog converts (DAC) 46, 48, and 50.

The Y, C' and C" analog signals are respectively filtered by low pass filters (LPF) 52, 54 and 56 and applied to matrix circuit 58 which decodes the red (R), green (G), and blue (B) video signals. NTSC encoder 60 encodes the RGB signals into a composite NTSC signal which is applied to video monitor 44 for display of the color video signal.

Figures 5, 6:
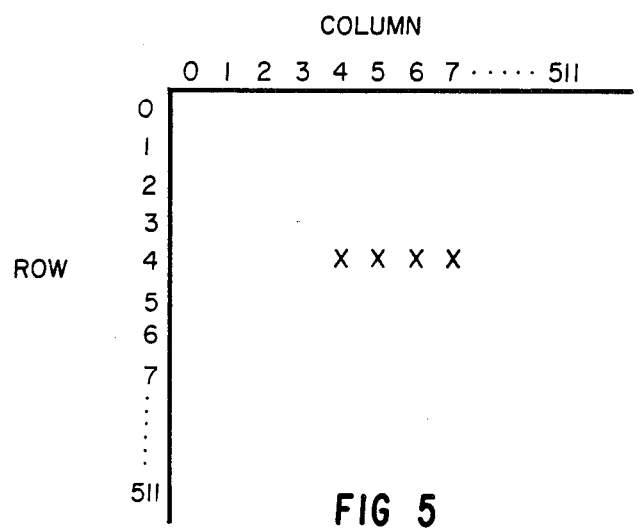
FIG. 5 is an illustrative diagram depicting a matrix of pixels of a video frame to be processed by the apparatus of FIG. 1.
FIG. 6 is a table converting pixel row and column decimal number address location into binary number address locations.

Referring now to FIGS. 5 and 6, there is illustrated another mode of operation of the apparatus of FIG. 1. In FIG. 5, there is diagrammatically illustrated a matrix representation of a frame of video information to be stored in framestore 38. In the illustrated example, a frame of video information comprises a matrix of 512 horizontal lines having 512 pixels per line. Thus, the horizontal lines are shown on the left-hand side as extending from row 0 to row 511. The location of a pixel within a row is identified by a column number as column 0 to column 511. As illustrated, four pixels are represented by X's in row 4 and columns 4, 5, 6, and 7.

Referring to FIG. 6, there is tabulated the digital address for each of the representative pixels of FIG. 5. In order to identify the address of a pixel by row and column, a 9-bit digital number is assigned to both the row address and the column address for a 512 by 512 matrix of video information. Thus, row 4, column 4 pixel is identified by the row address of "000000100" and a column address "000000100". Similarly, the address of the pixel in row 4, column 5 is "000000100", "000000101"; the address of the pixel in row 4, column 6 is "000000100", "000000110"; and the address of the pixel in row 4, column 7 is "000000100", "000000111". According to an aspect of the invention, of a single address is used to store more than one sequential samples into store 38. Thus, for example, a single address representing the first sample in a sequential group of samples (e.g. four) is used to write several data samples into sequential memory locations in the framestore 38 without using separate row and column addresses for each memory location. Such a technique effectively increases the writing speed into the framestore so that a frame of video information may be written into the framestore on more quickly. Thus, in the example given in FIGS. 5 and 6, a single row and column address is given for each group of four data samples to effect storage of four N+M/2 bit data samples in framestore 38.

It will be understood that N may be any whole number, odd or even and N may also be equal to M. For example, N and M may be equal to the same even number (such as 8). The choice will depend upon the resolution desired of the luminance and chrominance signals.

The invention has been described in detail with particular reference to certain preferred embodiments thereof, but it will be understood that variations and modifications can be effected within the spirit and scope of the invention.

What is claimed is:

1. Color video signal apparatus comprising:
   means for providing a color video signal including an analog luminance signal and two analog chrominance signals;
   analog-to-digital converter means (1) for converting said analog luminance signal into an N bit digital luminance signal having a sampling frequency F and (2) for converting each of said two analog chrominance signals into an M bit digital chrominance signal having a sampling frequency ¼ F, where M is an even integer;
   a digital memory; and means for storing in said digital memory N bits of a sample of said digital luminance signal and simultaneously ½ M bits of a sample of one of the two digital chrominance signals such that for each set of four successive N bit samples of said digital luminance signal stored in said digital memory, an M bit digital sample of each of said two digital chrominance signals is stored in said memory.

2. The apparatus of claim 1 including means for multiplexing said two analog chrominance signals so as to supply to said converter means a multiplexed chrominance signal having alternating samples of said two analog chrominance signals.

3. The apparatus of claim 2 wherein said converter means converts each sample of said multiplexed chrominance signal into two successive M/2 bit digital chrominance signals.

4. The apparatus of claim 1 wherein said digital memory is capable of storing a frame of a color video signal.

5. The apparatus of claim 4 wherein said digital memory comprises a dynamic random access memory and includes means for addressing said memory so that a single address is effective in storing a plurality of sequential data samples into said memory.

6. Color video signal frame store apparatus comprising:

means for providing a color video signal including an analog luminance (Y) signal and two analog chrominance (C', C") signals;

luminance analog-to-digital converter (ADC) means for converting said analog luminance signal into an N bit digital luminance signal having a sampling frequency F;

chrominance analog-to-digital converter (ADC) means for converting each of said two analog chrominance signals into an M bit digital chrominance signal having a sampling frequency ¼F where M is an even integer;

a digital memory for storing a frame of said color video signal; and means for simultaneously writing into said digital memory N bits of a sample of said digital luminance signal and ½ M bits of a sample one of the two digital chrominance signals such that for each set of four successive N bit samples of said digital luminance signal written into said memory, an M bit digital sample of each of said two digital chrominance signals is written into said memory.

7. The apparatus of claim 6 wherein each time said memory is addressed, said writing means writes a sequence of more than one N+M/2 bit digital sample into said memory.

* * * * *